United States Patent [19]
Andresen

[11] 4,294,055
[45] Oct. 13, 1981

[54] HONEYCOMB OVERHEAD DOOR

[76] Inventor: Donald D. Andresen, 10380 W. Whitesbridge Ave., Fresno, Calif. 93706

[21] Appl. No.: 768,325

[22] Filed: Feb. 14, 1977

Related U.S. Application Data

[63] Continuation of Ser. No. 479,643, Jun. 17, 1974, abandoned.

[51] Int. Cl.³ ............................................. E05C 2/32
[52] U.S. Cl. ..................................... 52/795; 428/116; 52/793; 49/197; 49/501
[58] Field of Search ................................. 49/501, 197; 52/615-621, 795, 793; 428/116

[56] References Cited

U.S. PATENT DOCUMENTS

| | | | |
|---|---|---|---|
| 2,399,666 | 5/1946 | Een ........................................ | 52/618 |
| 2,710,080 | 6/1955 | Negy ..................................... | 49/501 |
| 2,827,670 | 3/1958 | Schwindt ............................. | 52/620 |
| 2,893,076 | 7/1959 | Herts ................................... | 52/615 |
| 3,151,712 | 10/1964 | Jackson ................................ | 52/615 |

FOREIGN PATENT DOCUMENTS

| | | | |
|---|---|---|---|
| 961785 | 6/1964 | United Kingdom ................ | 428/116 |
| 1269244 | 4/1972 | United Kingdom ................ | 428/116 |

*Primary Examiner*—Kenneth Downey
*Attorney, Agent, or Firm*—Fulwider, Patton, Rieber, Lee & Utecht

[57] ABSTRACT

There is disclosed a panel construction which is useful for overhead doors where the door is supported at side bearing points and is supported, when open, in an overhead, horizontal position. The door is formed of a core having a honeycomb structure which is defined by a plurality of parallel strips of sheet material, each formed into a sinuous path and bonded to immediately adjacent strips at its outwardly bowed extremities, the assembly of strips of sheet material thereby providing a honeycomb or reticulated core structure. The core is aligned in the door with the strips of material extending across the width of the door. The door is provided with covering sheets which extend over the opposite sides of the honeycomb core. The covering sheets are bonded securely to the edges of the strips of sheet material of the honeycomb core by adhesive material which, preferably, has some resiliency. When necessary, the door structure can be braced by internal spine members which are formed with a honeycomb core sandwiched between covering material strips. The door can be formed with upper and lower horizontal and upright frame members at either end or, alternatively, can be open at its edges and the edges can be covered by channel members which can be secured to the door to provide mounting support for hardware fixtures.

5 Claims, 10 Drawing Figures

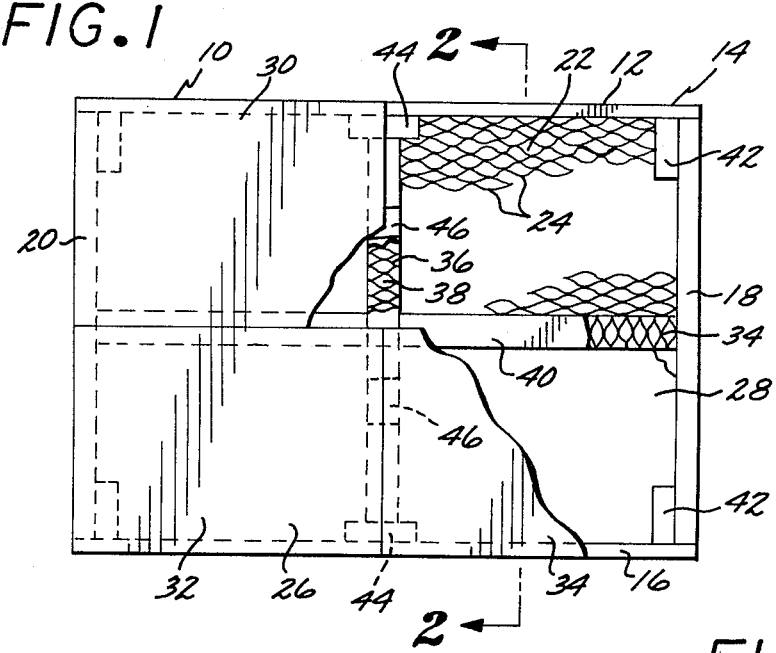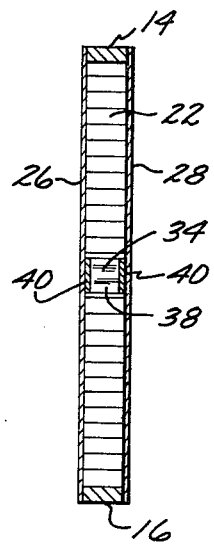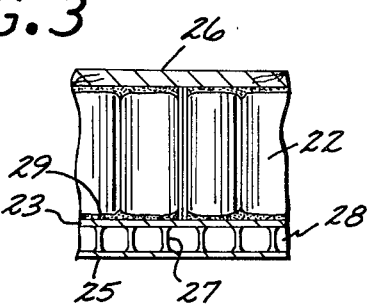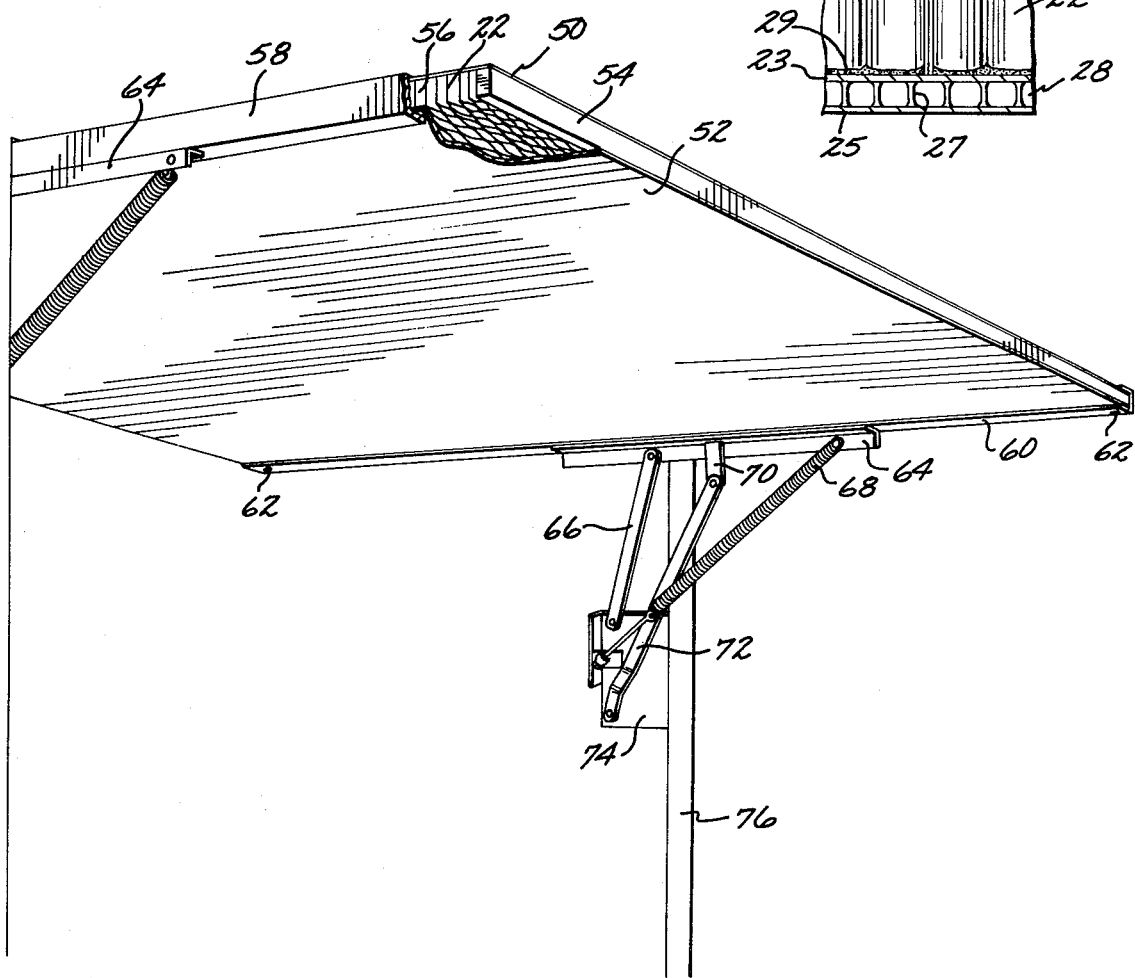

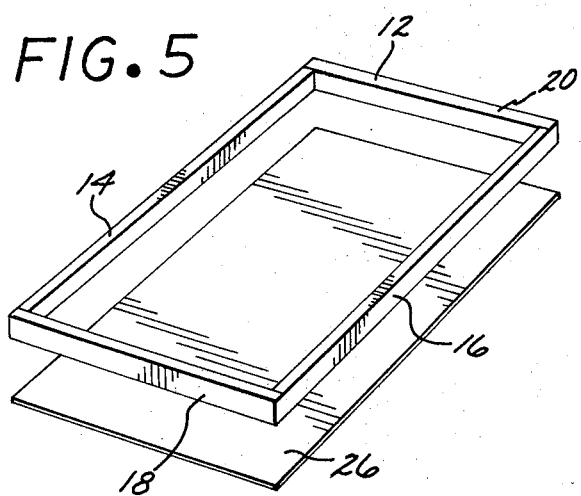
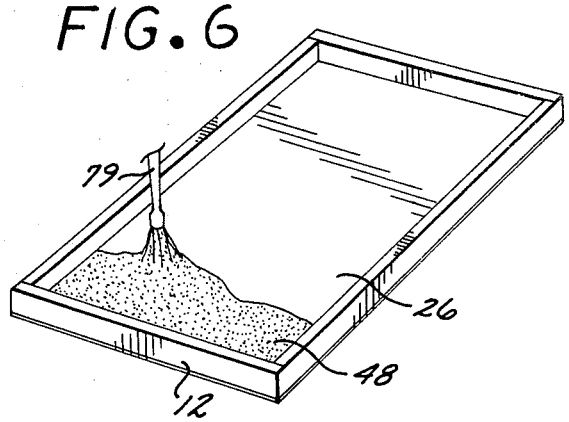
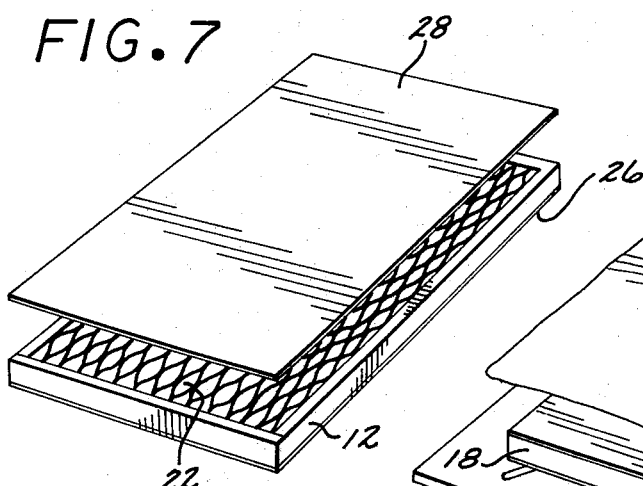
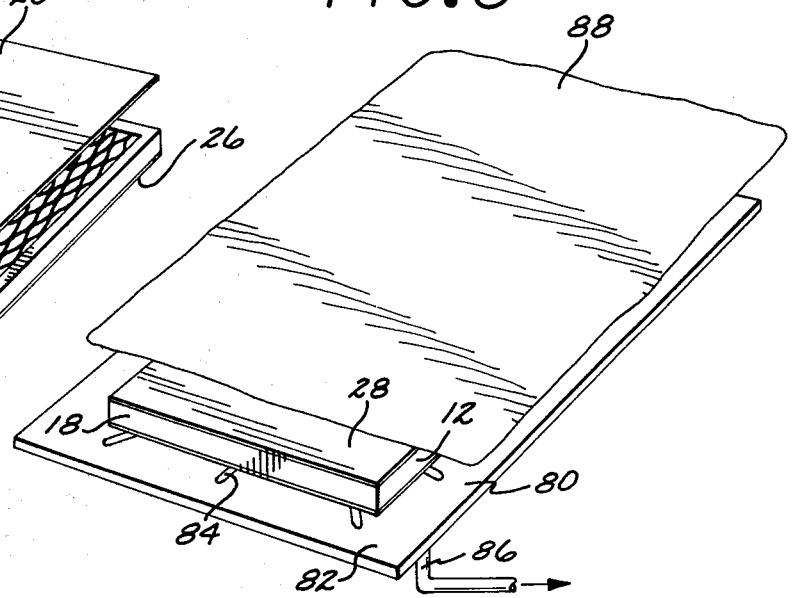
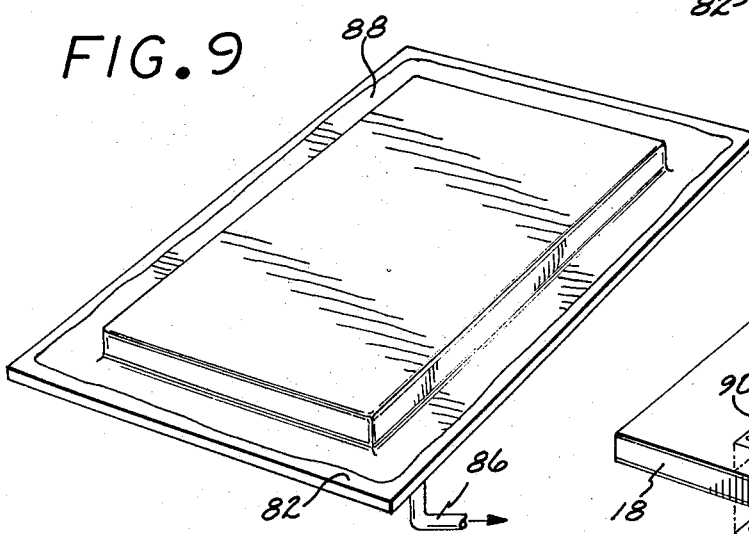
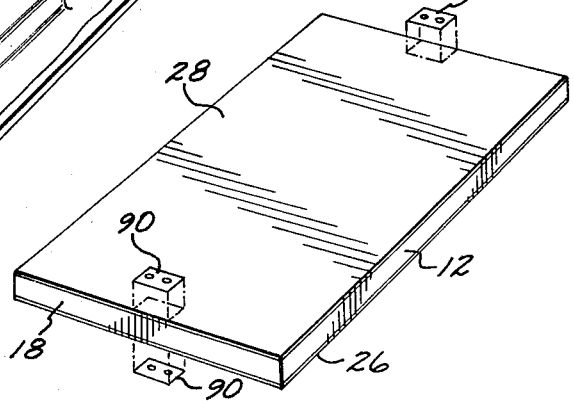

HONEYCOMB OVERHEAD DOOR

This is a continuation of application Ser. No. 479,643, filed June 17, 1974, now abandoned.

BACKGROUND OF THE INVENTION

1. Field of the Invention

This invention relates to lightweight structural panels and, in particular, to structural panels ideally suited for use as overhead garage doors and to a method for their manufacture.

2. Description of the Prior Art

Structural panels which have, heretofore, been used for garage doors in residential housing have been formed with wood framing and internal bracing and covered on one or both sides with heavy exterior plywood or similar construction material. This results in heavy and massive doors which require massive springs and hinges for their operation. The stiffness-to-weight ratio of the materials employed in construction of such doors is generally inadequate to provide a panel which resists sagging or bending when supported in the open, horizontal position on hinges located at the opposite ends of the panel. Accordingly, most of the panels must be additionally braced by truss rods which extend between the opposite ends of the door, thereby adding to the complexity and weight of the panel. The massive springs employed to balance the door so that it can be readily opened are a hazard to persons and property since failure of the springs or the associated hardware often results in hardware fragments being projected into the garage.

Although it has been generally desirable to provide a lighter weight panel that would be useful as a garage door, heretofore such attempts have been frustrated by the severe use conditions of garage doors. Such panels must be strong and rigid and durable under climatic extremes which include subfreezing temperatures and tropical heat and humidity. The panels should have a high shock and impact resistance to avoid failure upon prolonged use as well as to resist the pounding of tennis balls, basketballs and the like, since these doors are commonly used as backstops in children's play. The door structure should also be rigid in the vertical position and should be rigid and nonsagging when supported overhead from its opposite ends, preferably without the employment of truss rods and similar hardware.

BRIEF STATEMENT OF THE INVENTION

This invention provides a lightweight structural panel which is ideally suited for use as an overhead door, typically as a garage door. The construction employs a core formed of a honeycomb or reticulated structure that is defined by a plurality of parallel strips of sheet material, each strip being formed into a sinous path and bonded to immediately adjacent strips at its outwardly bowed extremities. The core is aligned in the panel with the strips extending across the width of the door to impart rigidity to the door when it is supported from its opposite ends in a horizontal position. The core is covered with sheets of material having a suitable stiffness-to-weight ratio, typically plywood or ribbed sheet metal, and is provided with at least upper and lower cross frame members. The sheet material is bonded to the honeycomb core by a resilient adhesive which bonds between the edges of the strips of sheet material and the interior surfaces of the covering sheet material. The door construction also includes upright end frame members which these can be formed as an integral part of the door and covered by the cover sheets or, alternatively, can be separate channel members which are placed over the open end edges of the panel.

When panels are to be constructed of dimensions which exceed the single sheet dimensions of the covering sheets, the panel can be internally braced with spline members. These members are formed with a honeycomb construction and are elongated beam members having bearing surfaces formed of strips of sheet material which are separated by a honeycomb core.

The preferred adhesive material used for bonding the covering sheets to the honeycomb core is a polyurethane foam, which, preferably, is applied across the entire interior surface of the covering sheet materials to form a layer of polyurethane having a closed cell foam texture in which the edges of the sheet material of the honeycomb door are embedded. It has been found that this adhesive is ideally suited for the climatic and structural demands placed on garage doors.

The doors are constructed by a simple manufacturing process wherein the frames are assembled and secured to one of the covering sheets and the interior surfaces of the covering sheets are then coated with the adhesive. The honeycomb core is laid within the confines of the structural frame, resting on the associated covering sheet. The remaining covering sheet is then placed over the honeycomb core and is drawn securely in place by the application of a vacuum to one side, preferably the underside, of the panel. The compression of the covering sheets about the honeycomb door by the applied vacuum is faciliated by covering the assembly with a flexible fabric or mat.

BRIEF DESCRIPTION OF THE DRAWINGS

The invention will now be described by reference to the drawings, of which:

FIG. 1 is a side elevational view of a panel construction of the invention;

FIG. 2 is a view along lines 2—2 of FIG. 1;

FIG. 3 is a partial, sectional view of a panel;

FIG. 4 illustrates a structural panel of the invention supported in a typical overhead, garage door installation; and FIGS. 5–10 illustrate the steps of manufacture of the structural panels of the invention.

DESCRIPTION OF THE PREFERRED EMBODIMENTS

Referring now to FIG. 1, the structural panel 10 can be seen to comprise a structural frame which, in the embodiment of FIG. 1, includes upper cross frame member 14 and lower cross frame member 16 with vertical end members 18 and 20. The space within the structural frame members is filled with a honeycomb or reticulated structure 22 formed by a plurality of strips 24 of sheet material formed into a sinuous path. Each strip of sheet material 24 is bonded at its outwardly bowed extremities to the immediately adjacent strips to form the honeycomb, reticulated structure illustrated in the figures.

Suitable honeycomb structures for use in this construction are commercially available. Such materials can be obtained from the Hexcell Corporation and are formed of paper, typically Kraft paper. The paper can be untreated, however, it is preferably impregnated with a suitable resin for increased stiffness. Suitable impregnating resins which are employed are phenol-formaldehyde resins and, typically, the paper is impregnated with from 1 to about 15% of the phenolic resin to impart stiffness and moisture resistance thereto. The honeycomb core is available in various weights of paper from 50 to about 150 pound paper. An example of a suitable material is Hexcell KP 80 which is formed of a Draft 80 pound paper and impregnated with about 11% by weight of a phenolic resin. This product is useful when employed with a honeycomb structure having cells from one-half to about two inches, preferably from about three-quarters to one and three-quarters inches. These dimensions of the cell are the dimensions between the bonded surfaces of the strip material where each strip is bonded to its immediately adjacent strip. Typically, the cores can have thicknesses from about 0.5 to about 3 inches, preferably from about 0.75 to about 2 inches.

The honeycomb core 22 is positioned in the door with the strips of sheet material of the honeycomb extending across the width of the door so as to impart rigidity and resistance to bending of the door when it is supported at opposite edges in a horizontal position.

The door is covered on its opposite surfaces with covering sheets 26 and 28. The door illustrated in FIGS. 1 and 2 is of dimensions which exceed the single sheet dimensions of the covering sheets and, accordingly, a plurality of sheets such as 30, 32 and 34, are employed on each side of the panel. When multiple sheets are employed on each side of the panel, it is desirable to employ internal stiffeners or splines as bracing in the door construction. Desirably, such internal bracing is also of a lightweight, honeycomb core structure such as illustrated by stiffening members 34 and 36. Each stiffening member comprises a honeycomb core 38 which is covered by opposite strips 40 of the sheet material to form a very rigid and lightweight beam. The construction of these internal stiffeners can be seen in the sectional view of FIG. 2 where the horizontal stiffener member 34 is shown to have opposite webs 40 separated by a honeycomb core 38.

Various internal block members can be provided in the door to provide supports for the attachment of the necessary door hardware. Such members include blocks 42 which can be positioned at each internal corner of the door; blocks 44 which can be centrally positioned at the top and bottom of the door and blocks 46 which are above and below the center of the door along its midline. Blocks 42 serve as supports for mounting of door hardware such as the conventional truss rod, should such prove necessary to maintain the rigidity of the door. Blocks 44 provide support for door hardware such as the automatic door openers and the like. Blocks 46 provide support for handles, locks and the like. Preferably, the internal blocks are symmetrically located in the door so that the door can be mounted in any position in the door frame.

Various materials can be used as the covering sheets. Preferably, materials which are employed have a high stiffness-to-weight ratio and suitable materials for this purpose are wood veneers and composite boards such as three or five veneer plywood. The plywood can be of exterior grade with at least one surface relatively smooth and free of knots. If of interior grade, the plywood should be treated with moisture-proofing coatings. Preferably, for maximum strength and minimum weight, both sides of the plywood are smooth and free of knots and other structural weaknesses. The covering sheets should also be oriented on the panel with their maximum stiffness extending across the width of the door in alignment with the direction of the strips of the honeycomb core. With most plywoods, this orientation would be with the grain of the outer wood veneers extending across the width of the door panel. Other suitable materials for the covering sheet include rigid foamed plastics such as rigid urethane foam, polystyrene foam, foamed cellulose acetate, phenolic foams, urea-formaldehyde foam, polyethylene foam, etc. Preferably, foamed sheets or boards which have been rendered fire resistant by the incorporation of various flame retardants are selected.

The covering sheet can, itself, have a honeycomb construction. This construction would employ two, thin, covering sheets with a sandwiched honeycomb core and the final door will then be formed as a honeycomb laminate with two honeycomb cores separated by a thin covering sheet. FIG. 3 illustrates this construction wherein a portion of a door is shown in cross-sectional view. The door has a honeycomb core 22 bonded, at its opposite sides, to covering sheet 26 which can be a three or five plywood veneer and to a honeycombed sheet 28. The latter is an assembly of opposite, thin sheets 23 and 25, which can be formed of any of the aforementioned sheet material or can be paper such as that previously described as useful to form the honeycomb cores. The honeycomb core 27 is similar to the aforedescribed honeycomb cores and can have a thickness from 10 to about 100 percent of that of core 22. Any suitable adhesive can be used in bonding core 27 and sheets 25 and 27 and, if desired, the assembly can be impregnated with a resin for improved stiffness and moisture resistance.

As previously mentioned, the honeycomb and covering sheets assembly is secured by a suitable adhesive between the covering sheets 26 and 28 and the edges of the honeycomb core 22. Preferably, an adhesive having some resiliency or plasticity in the cured state is used. Suitable adhesives include the preferred polyurethane resins, polybutadiene and copolymers thereof with comonomers such as styrene, acrylonitrile, etc., resorcinol resins, plasticized polyvinyl acetate and copolymers of polyvinyl acetate with internal plasticizing comonomers such as alkyl acrylates, methacrylates and the like.

Hot melt adhesives can also be used. These adhesives are available with a wide range of ingredients, however, they generally comprise a thermoplastic bodying agent such as a polyvinyl acetate with a high melting point wax, a tackifier such as a rosin product and an anti-oxidant. These adhesives would be applied in a molten condition suitably by dipping both sides of the honeycomb core to a slight depth, e.g., 0.1 to 0.5 inch, into a molten bath of the hot melt and then completing the assembly of the panel.

The adhesive can be employed in a foamed or unfoamed state, however, the foamed adhesives are preferred. The adhesive other than hot melt types, can be applied dissolved in a volatile solvent such as an ester, alcohol and the like or can be applied as a latex. As shown in FIG. 3, the adhesive layers 25 and 27 are provided as layers of foamed polyurethane which extend over substantially the entire inside surfaces of covering sheets 26 and 28. The thickness of such layers 25 and 27 can be from about 1/64 to about ¼ inch, preferably from about 1/32 to about ⅛ inch in the foamed state.

As shown in FIG. 3, the adhesive has a tendency to be drawn up on the strips of material of the honeycomb core 22, forming a continuous fillet 29 at the juncture of the core edges and interior surfaces of the covering sheets.

The preferred polyurethane adhesive is a well known material. Suitable polyurethane adhesives are obtained by mixing a reactive hydrogen liquid with an organic diisocyanate. When a foamed adhesive is to be formed, a gas generating reactant is also included. Typical such reactant is water and excess of the diisocyanate which react to liberate carbon dioxide. Suitable catalysts are employed to obtain the proper rate of reaction, i.e., curing, and various surface active agents can be used to stabilize the foam. The reactive hydrogen component can be a polyester, polyalkylene ether or fatty acid glyceride. Suitable materials have molecular weights from 500 to about 5,000. The polyethers employed are essentially linear with terminal hydroxol groups. The polyesters that can be employed are prepared with excess glycol and, accordingly, have low acid numbers and moderate to high hydroxol numbers. In general, the reactive hydrogen liquids have hydroxol numbers between about 320 and acid numbers less than about 10. The flexible foams are prepared with components having hydroxol numbers between 20 and 100, semi-rigid foams are obtained from components having hydroxol numbers between about 100 and 180 and rigid foams are obtained with components having hydroxol numbers between about 180 and 300.

The diisocyanates employed are, in general, arylene diisocyanates such as 24-tolylene diisocyanate and liberate carbon dioxide, thereby serving as the gas generating agent for obtaining a foam from the product. The properly formulated polyurethane adhesive can be obtained by use of commercially available mixtures. Typically, these materials, will react and cure to a foam adhesive within a period of from 5 to about 125 minutes.

FIG. 4 illustrates a garage door of the invention and illustrates the structural panel supported in the overhead, horizontal position. As shown, the structural panel is formed by sheet covers 50 and 52 with upper and lower horizontal frame members such as 54 extending across the width of the door. The door is provided with a honeycomb core 22 which, as previously mentioned, is disposed with the continuous strips of material of the core extending across the width of the door.

The opposite ends of the door are open at 56 and are not enclosed with vertical frame members such as 18 and 20 described with regard to FIGS. 1 and 2. This construction thereby provides a door which can be trimmed to any suitable width for custom fitting of a door frame. The door can be employed in combination with vertical channel members 58 and 60 which can be of suitable material such as metal or plastics and which have a sufficient dimension to overlie the open edges of the panel. These channels can be secured to the structural panel by suitable fastening means such as bolts 62 that can be placed at each corner of the structural panel and extend through the included end of the horizontal frame members such as 54. Other means such as riveting, stapling or adhesively bonding can also be used. The channel members 58 and 62 also serve to provide the structural support for the door hardware such as mounting brackets 64 which are in the shape of angle brackets bearing pivotal supports for the door hardware such as the hinge arm 66 and spring 68. The angle member 64 is shown as also bearing an arm 70 to which is pivotally secured arm 72; arms 66, 72 and spring 68 extending to pivotal connections on frame bracket 74 that is mounted on the frame 76 of the door opening. The hinges of this construction thereby provide end support for the door in the closed and open position. When the door is open, as illustrated, the hinges provide supports at opposite ends of the door which extends in a horizontal position therebetween.

The structural panels for use in the invention are manufactured by a simple and direct process. As shown in FIG. 5, the frame 12 for the door is assembled with suitable structural members such as the horizontal cross members 14 and 16 and upright end frame members 18 and 20. When necessary, internal bracing or spline members such as 34 and 36 previously described, as well as various internal block members, can be incorporated in the frame. The assembled frame is thereafter placed over and secured to one of the covering sheets 26 for the panel. The covering sheet 26 can be a single sheet as illustrated or, as shown in FIGS. 1 and 2, can be a plurality of sheets.

Referring now to FIG. 6, the adhesive is then coated on the inside surfaces of the covering sheets such as 26 by spraying, brushing or rolling the adhesive material 48 as a continuous layer over the inside surfaces of these covering sheets. Preferably, the resin employed is a polyurethane resin which is sprayed through a suitable spray applicator 79.

The honeycomb core 22 is then placed within the confines of the frame 12 and seated in the resin coating on the inside surface of the lowermost sheet 26. The upper sheet 28, which has also been coated on its inside surface with the bonding resin, is then placed over the assembly of the honeycomb door and structural frame 12 in the manner illustrated in FIG. 7.

After the upper cover sheet 28 has been placed on the assembled frame and honeycomb core assembly, the assembly can be placed upon a vacuum table 80 which comprises a rigid upper work surface 82 having a plurality of ducts or internal grooves 84 communicating with a header that is attached to conduit 86 which extends to an evacuation apparatus such as a vacuum pump for evacuation of the header and grooves 84, thereby drawing the assembled structural panel tightly onto upper surface 82. The assembled structural panel can then be covered with a suitable flexible membrane, such as a canvas, flexible rubber mat or fiber reinforced vinyl sheeting 88 as illustrated in FIG. 8.

The continued application of vacuum through line 86 will draw mat 88 tightly against the smooth upper work table surface 82 and compress the assembly of the structural panel tightly against this work surface, thereby insuring that the structural members remain securely in place during the curing and foaming of the elastomeric adhesive composition. Upon completion of the curing step, which typically can be from five to about 125 minutes at temperatures from 50° about 150° F., the vacuum is removed from conduit 86, the rubber mat is removed and the completed panel, as illustrated in FIG. 10, is removed from the work table. Thereafter, suitable hardware such as plate brackets 90 can be secured to the exterior surfaces of the covering of the panel. These plates can be used as alternatives to the use of internal blocks in the panel by mounting a plate to each opposite side of the door and extending fasteners such as bolts or rivets therebetween.

The door panels, as thus described, offer many advantages. They are light weight and, consequently, require less massive hinges and springs and can be readily installed by unskilled workers. They are covered on both sides and have no unsightly braces or framing and, therefore, offer surfaces which can be finished with trim and the like to blend with any home decor. The panels also have superior heat and sound insulation because of the multi-chambered honeycomb core construction. The phenolic resin coating of the honeycomb core imparts thereto a repellent for vermin and fungus and a high degree of water resistance.

The invention has been described with reference to the presently preferred and illustrated mode of practice thereof. It is not intended that the specifically illustrated and presently preferred mode of practice be construed as unduly limiting of the invention. Instead, it is intended that the invention be designed by the means and their obvious equivalents set forth in the following claims.

What is claimed is:

1. A panel construction useful for doors which are supported at side bearing points and are supported thereby in an overhead, horizontal position which comprises:

a plurality of cores formed of a honeycomb structure defined by a plurality of parallel strips of sheet material, each formed into a sinuous path and bonded to immediately adjacent strips at its outwardly bowed extremities, said core being aligned with said strips extending across the width of said door;

said cores being interspaced by internal spline members, each spline member being formed of a core of said honeycomb structure;

upper and lower cross frame members;

covering sheets extending over the opposite sides of said honeycomb core; and, foamed adhesive material on the interior surfaces of said covering sheets and drawn up on said strips of sheet material, forming a continuous fillet at the juncture of the edges of said strips and said covering sheets, thereby bonding said sheets to the edges of said strips of said core of honeycomb structure.

2. A panel construction for lightweight structural panels which comprises:

a plurality of cores, each formed of a honeycombed structure defined by a plurality of parallel strips of sheet material, each formed into a sinuous path and bonded to immediately adjacent strips at its outwardly bowed extremities;

spline member means interspacing between adjacent ones of said cores to form a panel assembly with each spline member means formed of a core of the aforesaid honeycomb structure adhesively edge bonded to sheet material strips;

a plurality of covering sheets extending in edge butting relationship coextensively over each side of the panel assembly with said spline member means being positioned in said assembly to underlie the butted edges of said covering sheets and provide a bonding surface therefor; and, adhesive material on the interior surfaces of said covering sheets and bonding said sheets to the edges of said strips of said honeycomb core and to the sheet material strips of said internal spline member means.

3. The panel construction of claim 2 wherein said adhesive composition is resilient.

4. The panel construction of claim 3 wherein said adhesive is a polyurethane resin.

5. The panel construction of claim 2 wherein said adhesive is a foam adhesive and is drawn up on the strips of sheet material and said cores, forming a continuous fillet at the juncture of the edges of said strips of sheet material and said covering sheets, thereby bonding said sheets to the edges of said strips of said core of honeycomb structure.

* * * * *